Jan. 18, 1949.  C. C. MOORE ET AL  2,459,713
HYDRAULIC CAM ADJUSTER
Filed Feb. 20, 1946  2 Sheets-Sheet 1
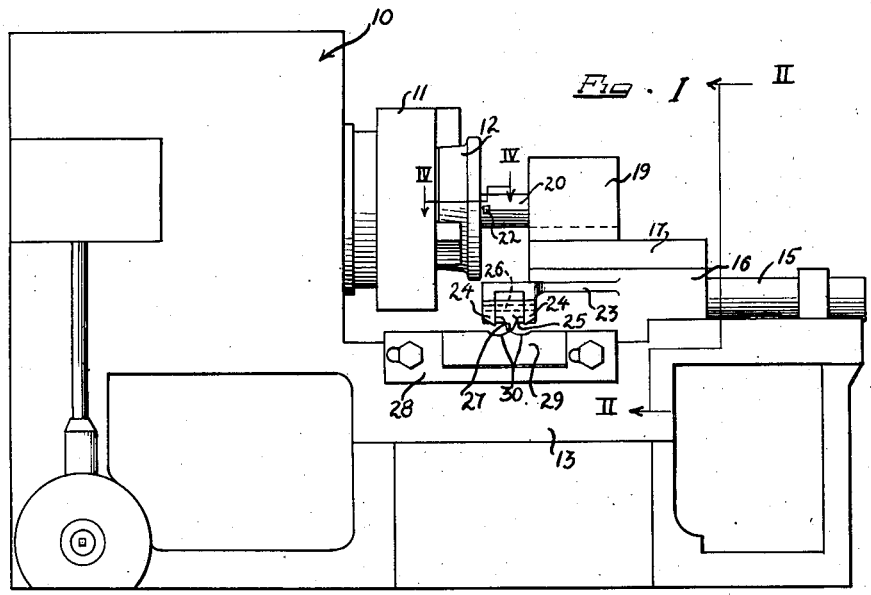
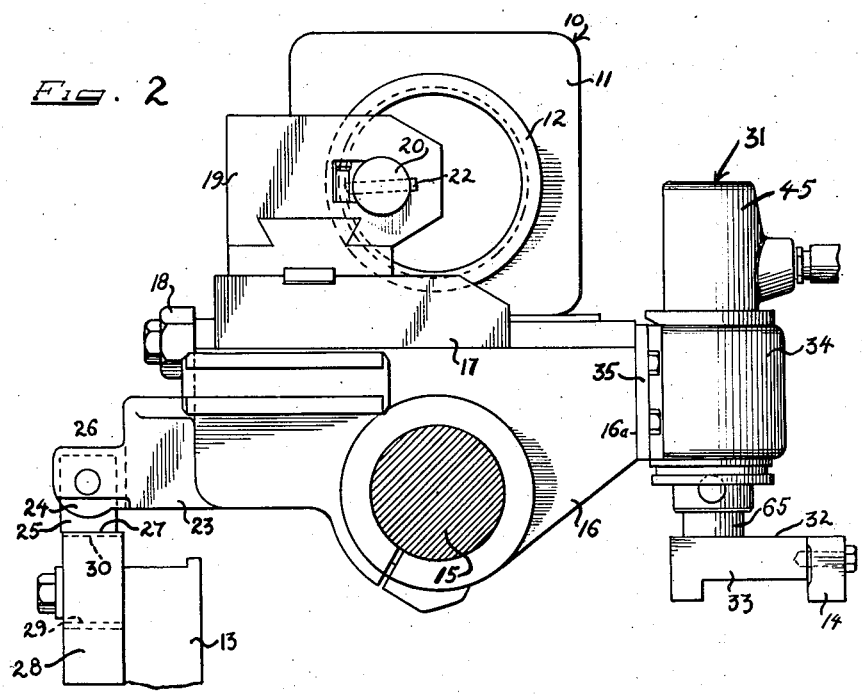
Inventors
Chester C. Moore
Carl F. King Jr.
by The Firm of Charles W. Hills Attys.

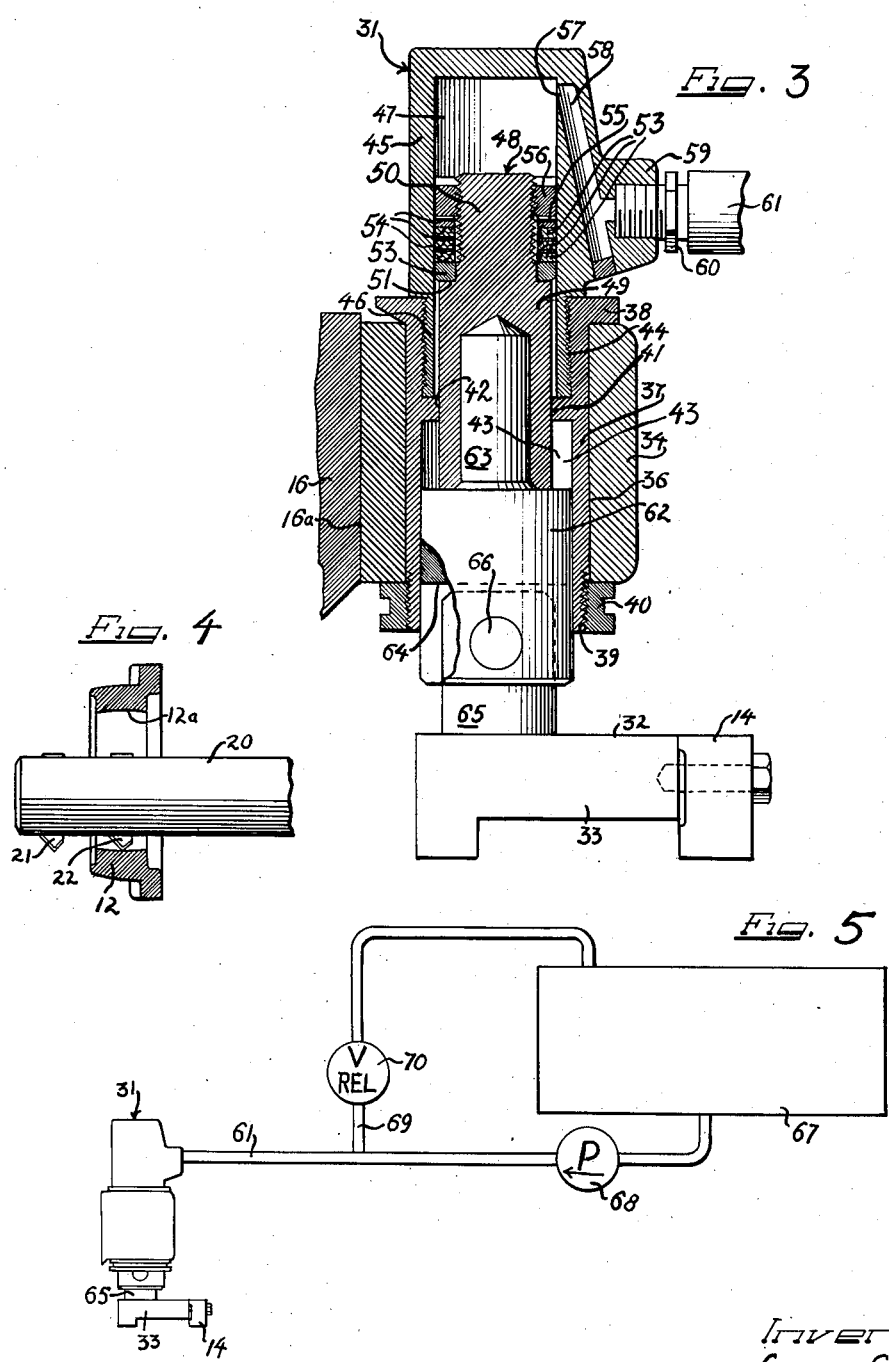

Patented Jan. 18, 1949

2,459,713

UNITED STATES PATENT OFFICE 2,459,713

HYDRAULIC CAM ADJUSTER

Chester C. Moore and Carl F. King, Jr., Aurora, Ill., assignors to Stephens-Adamson Mfg. Co., Aurora, Ill., a corporation of Illinois Application February 20, 1946, Serial No. 648,934

6 Claims. (Cl. 77—3)

This invention relates to a fluid pressure controlled cam arrangement for profile and contour cutting lathes. Specifically, the invention deals with a hydraulically urged cam controlled rocking lathe carriage which automatically swings a cutting tool along a predetermined cutting path as the tool advances.

Heretofore controlled cam racking of a lathe carriage as been accomplished by spaced opposed rigid cams acting on a carriage carried follower between the cams and riding thereon. Results obtainable with such arrangement are not highly accurate because the follower must have operating clearance between the cams so that it will not bind. In addition, the opposed rigid cams are subject to the wearing action of the follower riding thereon. Play or looseness is thus necessarily present in the control and results become less and less accurate as the lathe is used for mass production of parts.

Another disadvantage in heretofore known controlled cam rocking of a lathe carriage is the requirement for double sets of cams for each profile or contour to be turned. The arrangement is therefore expensive.

According to the present invention only one cam is needed for each profile or contour and the cam follower on the lathe carriage is caused to ride on this single cam with a carefully controlled predetermined amount of pressure that will not vary as the follower moves between high and low spots on the cam. The predetermined pressure is produced by a fluid pressure actuated jack subjected to the action of oil or other fluid maintained under carefully controlled constant pressure conditions.

In the preferred and illustrated embodiment of the invention the lathe carriage is rockably mounted on a shaft and has the cam follower and the jack mounted thereon on opposite sides of the shaft. The cam follower rides a cam that is fixed to the frame of the lathe. The jack carries a follower that rides on an accurately finished flat surface also affixed to the frame of the lathe. Oil or other jack actuating fluid is supplied to the jack by means of a pump. The pressure of the jack actuating fluid is accurately regulated by a relief valve arrangement. A pressure is selected for holding the follower in good riding contact with the cam and as the follower is raised and lowered by the cam, the carriage is rocked to carry the jack therewith. The jack urged follower riding on the flat finished surface carried by the lathe is held thereon in good bearing contact by the jack and the oil or other jack actuating fluid will flow to and from the jack to hold the desired riding contact of both followers on their respective cam and plate surfaces. The plate for the jack carried follower can be used for all types of profiles and contours. It is only necessary to provide a single cam for each desired profile or contour.

It is then an object of this invention to provide a fluid pressure controlled adjuster for cam actuated devices.

Another object of this invention is to provide a hydraulic adjuster for maintaining cam followers in constant riding engagement with operating cams irrespective of the contour afforded by these cams.

A specific object of this invention is to increase the accuracy of profile and contour cutting lathes by eliminating play or looseness in the cam and follower devices of such lathes.

A further specific object of this invention is to provide a lathe having a carriage rocked by a cam with a fluid pressure actuator that insures rocking of the carriage only by the cam.

Another object of this invention is to eliminate the heretofore necessary opposed cams for contour and profile turning lathes.

Other and further objects of this invention will be apparent to those skilled in the art from the following detailed description of the annexed sheets of drawings which, by way of a preferred example only illustrate one embodiment of the invention.

On the drawings:

Figure 1 is a front side elevational view of a lathe equipped with a hydraulic cam adjuster according to this invention.

Figure 2 is a transverse cross sectional view, with parts in end elevation, taken along the line II—II of Fig. 1.

Figure 3 is an enlarged axial cross sectional view, with parts in elevation, of the hydraulic jack for maintaining the cam follower of the lathe shown in Figs. 1 and 2 in constant bearing engagement with its actuating cam.

Figure 4 is an enlarged horizontal cross sectional view, with parts in plan, taken along the lines IV—IV of Fig. 1.

Figure 5 is a diagrammatic view illustrating the fluid circuit for actuating the jack of Fig. 3.

As shown on the drawings:

In Figs. 1 and 2 the reference numeral 10 designates a somewhat diagrammatically illustrated contour or profile turning lathe. The lathe 10 has a head stock 11 supporting and rotatably driving a work piece such as a pillow block or housing 12 for tiltably supporting a bearing (not shown). The lathe 10 has front and rear side rails 13 and 14 and a longitudinally extending support post or rod 15 between the rails 13 and 14.

A lathe carriage 16 is slidable and rockable on the post 15 and extends transversely across the space between the side rails 13 and 14. The carriage 16 has ways or tracks extending transversely of the lathe slidably supporting a platform 17 which is adjusted by means of a screw arrangement 18. The platform 17 carries a tool carriage 19 which is adjustable in a longitudinal direction on the platform. A tool post or holder 20 is carried by the tool carriage 19 and projects forwardly therefrom so as to enter the work 12. Tools 21 and 22, best shown in Fig. 4, are secured in transverse apertures in the forward end of the post 20 and project therefrom to act on the work piece 12.

The lathe carriage 16 has a laterally projecting arm 23 overhanging the front rail 13 and equipped with depending ears or lugs 24 in spaced opposed relation at its outer end. A cam follower 25 is positioned between the ears 24 and pivotally mounted on the arm by means of a pin 26 which extends through the ears. The cam follower 25 has a depending rib 27 with a rounded nose-like end edge of appreciable length as shown in Figs. 1 and 2.

The rail 13 of the lathe has a cam support bar or former bar 28 bolted thereon. This bar 28 has a recess in its top central portion receiving a cam bar 29. The cam bar is secured to the bar 28. The top edge of the cam bar 29 has two cam grooves or depressions 30 therein which determine the profile or contour to be cut in the work piece 12.

The cam follower 25 has its rib portion 27 arranged for riding on the top edge of the cam bar 29 into and out of the grooves 30 thereof to cause controlled rocking of the lathe carriage 16 on post 15. This rocking of the carriage 16 will swing the tool post 20 toward and away from the inner wall of the work piece 12 to carry the tools 21 and 22 in a controlled swinging path as they are advanced into the work piece. The type of cam grooves 30 illustrated in the drawings will cause the formation of an arcuate concave inner wall 12a on the work piece, as shown in Fig. 4. The tool 21 acts on the work piece 12 ahead of the tool 22 and its movement is controlled by the right hand cam groove 30 shown in Fig. 1 to produce a rough cut in the work piece. The tool 21 passes completely through the work piece as shown in Fig. 4 and the following tool 22 then acts on the inner wall of the work piece to finish the wall surface. The right hand cam groove 30 controls movement of the tool 21 as it is acting on the inner wall of the work piece 12.

In accordance with this invention the cam follower 25 is constantly held in good bearing contact with the top edge of the cam bar 29 by means of a hydraulic jack 31 carried by the lathe carriage 16 and acting on the accurately finished flat top surface 32 of a plate or bar 33 carried by the rear rail 14 of the lathe.

A sleeve-like housing 34 having a mounting pad 35 is bolted onto a rear vertical face or wall 16a of the carriage 16 as shown in Fig. 2. This housing 34, as shown in Fig. 3, has a cylindrical bore 36 therethrough. An adapter sleeve 37 is seated in the bore 36 and has the top flange 38 overlying the top of the housing 34. The adapter sleeve 37 has a threaded end 39 extending through the bottom of the housing 34. An adapter ring 40 is threaded onto the threaded end 39 of the sleeve 37 and is tightened against the bottom of the housing 34 to secure the sleeve 37 to the housing.

The sleeve 37 has a partition wall 41 intermediate its ends with a central aperture 42 therethrough. The partition wall divides the interior of the adapter sleeve 37 into a lower plunger bore 43 and an upper internally threaded portion 44.

A head cap 45 has an integral depending externally threaded portion 46 threaded into the portion 44 of the sleeve and bottomed on the partition wall 41. This cap 45 defines an internal cylindrical chamber 47 of slightly larger diameter than the aperture 42 of the partition wall 41. Chamber 47 extends from the closed top of the cap 45 through the portion 46 to the aperture 42 of the partition wall 41.

A hydraulic ram 48 is slidably mounted in the cylinder 47. This ram includes a rod 49 snugly fitting the aperture 42 of the partition wall 41 and having an externally threaded reduced upper end portion 50. A shoulder 51 is provided on the rods 49 at the bottom of the reduced section 50 thereof. A metal ring 52, such as a piston ring, is bottomed on the shoulder 51 and surrounds the reduced portion 50. Packing rings 53 separated by washers 54 are disposed around the portion 50 of the rod in superimposed relation above the ring 52. A spring washer 55 is seated on top of the top washer 54 and is compressed by a metal ring 56 threaded on the upper end of the portion 50. The assembly of rings 52 and 56 with the packing and washers therebetween provides a piston head slidably engaging the cylinder 47 and preventing leakage of fluid from the space in the cylinder above the ram.

Fluid is introduced into the top end of the cylinder 47 through a port 57 at the end of a passage way 58 provided in the cap 45. The cap 45 has an internally threaded nipple 59 communicating with the passage 58 and receiving in threaded relation therein a coupling fitting 60 on the end of a flexible hose or tube 61.

The bore 43 of the sleeve 37 slidably receives in snug riding engagement therein a cylindrical plunger 62. This plunger 62 has an upwardly projecting pin portion 63 anchored in a hole provided in the bottom of the rod 49. The plunger 62 has a transversely slotted end 64 receiving in free tiltable relation therein a cam follower 65. The cam follower is pivoted on a pin 66 extending across the tranversely slotted end 64 of the plunger. This cam follower 65 rides on the top wall 32 of the plate or bar 33.

As shown in Fig. 5, operating fluid such as oil for the jack 31 is supplied from a tank 67. A pump, such as a positive displacement pump 68, pressures oil from the tank 67 through the hose 61 into the top of the cylindrical chamber 47. A bypass conduit 69 connects the pressure side of the pump 68 back to the tank 67 and a sensitive pressure relief valve 70 is provided in the bypass conduit 69.

Oil pressured into the cylinder chamber 47 will force the ram 48 downwardly to urge the cam follower 65 against the top face 32 of the plate 33 and this will cause a reaction on the lathe carriage 16 tending to rock the carriage to move the cam follower 25 against the cam bar 29. The cam bar 29 of course resists the rocking movement and any desired amount of pressure between the follower 25 and the cam bar 29 can be maintained by regulation of the relief valve 70 which controls oil pressure in the jack 31. As the cam follower 25 is moved along the cam bar 29 into a cam groove 30, the constant pressure of oil in the jack 31 will immediately force the ram 48 in a downward direction to maintain the cam follower 65 against the surface 32 thereby rocking the tool carriage 16. Conversely, when the cam follower 25 rides out of a cam groove 30, increased pressure in the jack cylinder 47 will be produced because the cam follower 25 will rock the carriage in a clockwise direction thereby moving the jack closer to the surface 32. In such event the relief valve 70 immediately relieves fluid back to the tank 67 to maintain the predetermined constant pressure in the jack.

In view of the above description it will be clear that this invention provides a hydraulic cam adjuster which will hold a cam follower in constant bearing engagement with a cam under the same pressure load conditions irrespective of movements imparted to the follower by the cam.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. A profile or contour forming lathe which comprises a main frame, a lathe post supported by said main frame, a lathe carriage slidable and rockable on said post, a driven lathe head on said lathe for rotatably supporting a work piece, said carriage having means for supporting a cutting tool to act on work supported by said head, a cam follower pivotally carried by said carriage, a cam secured on said main frame on one side of said post, a plate having a flat accurately finished surface secured on said main frame on the other side of said post, a fluid pressure actuated jack on said carriage, a cam follower pivoted on the ram of said jack and acting on said plate, and means for maintaining fluid under constant pressure in said jack to rock the tool carriage and hold both cam followers in constant engagement with the cam and accurately finished surface of the plate respectively.

2. A hydraulic cam adjuster for a rockable lathe carriage having a cam follower pivotally suspended from one side thereof and a cam coacting with said follower to rock the carriage, a hydraulic jack on said carriage having a slidably mounted ram therein, a cam follower pivoted on said ram and projecting from the jack, a plate having an accurately finished flat surface receiving said cam follower thereon, a pump supplying fluid under pressure to said jack, a bypass between said pump and jack, and a pressure relief valve in said bypass adapted to maintain a constant pressure on fluid in the jack and to permit flow of fluid out of the jack whenever pressures exceed a predetermined limit whereby said jack actuated cam follower will act on said surface of said plate to urge the rocking of the tool carriage in one direction while said cam will act on the other cam follower to rock the carriage in the opposite direction.

3. A hydraulic cam adjuster for a tool carriage comprising a jack housing arranged for mounting on a tool carriage, said jack housing having a piston chamber and a plunger chamber in aligned relation, a piston slidably mounted in said piston chamber having a rod depending therefrom into said plunger chamber, a plunger slidably mounted in said plunger chamber, said plunger having a transversely slotted bottom end, a cam follower extending into the slotted end of said plunger, a pivot pin connecting said cam follower and plunger to pivotally support the follower on the plunger, and means for introducing actuating fluid into said piston chamber above the piston therein.

4. The combination in a contour forming lathe of a main frame, a lathe post supported by said main frame, a lathe carriage slidable and rockable on said post, a driven lathe head on said frame for rotatably supporting a work piece, said carriage having means for supporting a cutting tool to act on work supported by said head, first and second cam followers respectively pivoted to said carriage on opposite sides of the rocking axis thereof, a cam acting on said first follower to impart controlled rocking movement to said carriage as it slides, an abutment on said main frame receiving said second follower in riding relation thereon, and fluid pressure means to act on the second follower to urge it against said abutment with a constant force for holding said first follower in constant bearing engagement with said first cam.

5. The combination in a contour forming lathe of a main frame, a lathe post supported by said main frame, a lathe carriage slidable and rockable on said post, a driven lathe head on said frame for rotatably supporting a work piece, said carriage having means for supporting a cutting tool to act on work supported by said head, first and second cam followers respectively connected to said carriage on opposite sides of the rocking axis thereof, a cam acting on said first follower to impart controlled rocking movement to said carriage as it slides, an abutment on said main frame receiving said second follower in riding relation thereon, a hydraulic jack mounted to support said second follower from said carriage, said jack including a piston operable to urge said second follower against said abutment in accord with the fluid pressure in said jack, and means operable to maintain constant fluid pressure in said jack to urge said second follower against said abutment with a constant force for holding said first follower in constant bearing engagement with said first cam.

6. The combination in a contour forming lathe of a main frame, a lathe post supported by said main frame, a lathe carriage slidable and rockable on said post, a driven lathe head on said frame for rotatably supporting a work piece, said carriage having means for supporting a cutting tool to act on work supported by said head, first and second cam followers respectively mounted on said carriage on opposite sides of the rocking axis thereof, a cam acting on said first follower to impart controlled rocking movement to said carriage as it slides, an abutment on said main frame having a smooth contour in the direction of sliding of said carriage receiving said second follower in riding relation thereon, a hydraulic jack mounted on said carriage to support said second follower, said jack including a piston operable to urge said second follower against said abutment in accord with the fluid pressure in said jack, and means operable to maintain constant fluid pressure in said jack to urge said jack against said abutment with a constant force for holding said first follower in constant bearing engagement with said first cam.

CHESTER C. MOORE.
CARL F. KING, Jr.

REFERENCES CITED

The following references are of record in the file of this patent:

UNITED STATES PATENTS

| Number | Name | Date |
| --- | --- | --- |
| 2,146,774 | Snader | Feb. 14, 1939 |
| 2,395,365 | Wilson et al. | Feb. 19, 1946 |